(12) United States Patent
Asa et al.

(10) Patent No.: US 8,251,354 B2
(45) Date of Patent: Aug. 28, 2012

(54) GAS SPRING

(75) Inventors: Takashi Asa, Komaki (JP); Yasushi Saito, Iida (JP)

(73) Assignees: Kayaba Industry Co., Ltd, Tokyo (JP); KYB-YS Co., Ltd., Nagano (JP)

( * ) Notice: Subject to any disclaimer, the term of this patent is extended or adjusted under 35 U.S.C. 154(b) by 575 days.

(21) Appl. No.: 12/250,541

(22) Filed: Oct. 14, 2008

(65) Prior Publication Data
US 2009/0096141 A1 Apr. 16, 2009

(30) Foreign Application Priority Data

Oct. 15, 2007 (JP) ................................. 2007-267318

(51) Int. Cl.
*F16F 9/32* (2006.01)

(52) U.S. Cl. ................................. 267/64.11; 188/322.12

(58) Field of Classification Search ............... 267/64.11, 267/64.12, 188, 120, 124, 322.12, 322.19, 267/300; 188/322.12, 322.19, 300
See application file for complete search history.

(56) References Cited

U.S. PATENT DOCUMENTS

| 4,807,855 A * | 2/1989 | Schuitema ................. 267/64.12 |
| 2005/0099060 A1 * | 5/2005 | Choi ............................. 301/127 |
| 2007/0045058 A1 * | 3/2007 | Murota et al. .................. 188/69 |

FOREIGN PATENT DOCUMENTS

DE 4209985 A1 * 9/1993
* cited by examiner

*Primary Examiner* — Robert A Siconolfi
*Assistant Examiner* — Anna Momper
(74) *Attorney, Agent, or Firm* — Hiroe & Associates; Dwayne L. Beatley

(57) ABSTRACT

A gas spring includes a rod body that has a base end side movable into and out of a cylinder body. The rod body is urged in a direction outward of the cylinder body by pressure from a gas sealed inside the cylinder body. A cylindrical cover body includes a base end portion connected to a distal end portion of the rod body that projects outside of the cylinder body. An end portion of the cover body receives a head end portion of the cylinder body inside a cylindrical cover member at an end portion of the cylinder body. The cover member covers a portion of the spring that would otherwise be exposed to the air between the end portion of the cover body and the end portion of the cylinder body when the cylinder body is contracted inside the cover body.

3 Claims, 4 Drawing Sheets

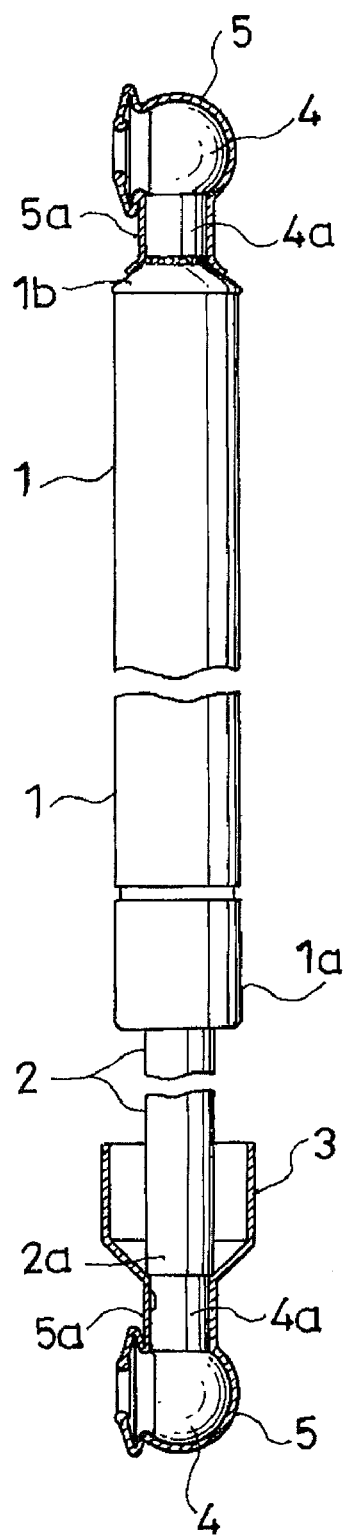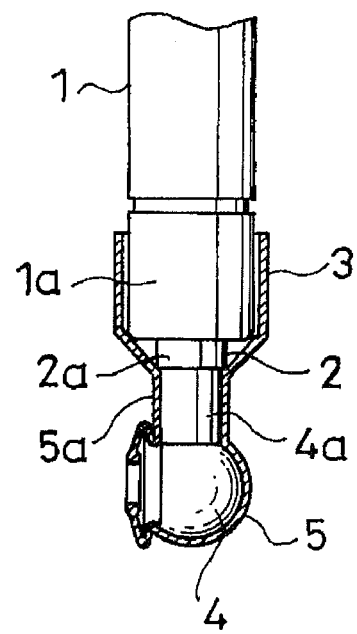
Fig. 1(a)
Fig. 1(b)

GAS SPRING

BACKGROUND OF THE INVENTION

The present invention relates to a gas spring and particularly to an improved gas spring for a rear door of a vehicle, for example.

Various proposals have been made for gas springs for rear doors of vehicles. In a gas spring of this type, a rod body is inserted into a cylinder body. The rod body is movable in and out of the cylinder body, but is urged in a direction outwardly of the cylinder body by the pressure of a gas sealed inside the cylinder body. The spring thus assumes an extended configuration when no external force is acts on the spring.

When such a gas spring is used on the rear door of a vehicle, the spring is extended when the rear door is open, and the door is kept open so long as no outside force is applied to the door. If, on the other hand, there is an unexpected external force such as the wind, for example, the rear door may close suddenly and unexpectedly. There have thus been proposals for gas springs that include lock mechanisms to maintain the gas springs in their extended configurations. One such spring is described, for example, in Japanese Patent Application Publication No. 2007-64281.

That gas spring, which includes a rod body that is inserted into and movable in an out of a cylinder body, also has a cylindrical body that forms a part of a cover body. The cover body is movable about a base end portion that is pivotally attached to a distal end portion of the rod body where the rod body projects outside of the cylinder body. The distal end portion of the rod body lies adjacent to a head end portion of the cylinder body.

The distal end portion of the cover body has a stopper member that forms a part of the lock mechanism. The stopper member holds the head end portion of the cylinder body inside it, and moveable in a direction perpendicular to the cylinder body as the cover body moves. When the stopper body is moved forward in a first direction, the stopper body interferes with the head end portion of the cylinder body and thereby stops the rod body's movement into the cylinder body. When the stopper body is moved backward in the other direction, the interference with the head portion of the cylinder body is no longer present and contraction of the rod body into the cylinder body is once again allowed.

The gas spring described in the Japanese patent application publication thereby allows a user to lock the spring in place by moving the stopper body with respect to the cylinder body. When the gas spring is thus locked, the gas spring will remain extended and will not contract even if an unexpected external force such as that of the wind acts on the rear door, and the rear door will therefore not close unexpectedly.

The gas spring described in the Japanese application works well when the lock mechanism is acting normally, but may be less than ideal, though, in that the lock mechanism may be prone to a certain malfunction in long term use.

More specifically, in the gas spring described above, the lock mechanism's stopper member's movement with respect to the cylinder body is limited by a detent structure. If the detent structure stops functioning, the locked state of the locking mechanism will not be maintained.

In a gas spring of this type, the lock mechanism's stopper member is frequently formed of a synthetic resin material because such a material is inexpensive and easy to manufacture, and light in weight.

It may occur, though, that dust or sand adhered to the outside of the cylinder body may polish or abrade the projection that forms the detent structure as the stopper member moves back and forth over the detent. If the projection is abraded sufficiently, the detent structure will no longer be effective and the lock mechanism will not function as intended.

There is a further possible problem, in that dust or fine sand adhering to the outside of the rod body that moves in and out of the cylinder body may also adhere to a lip portion of the dust seal at the head end of the cylinder body. That foreign material may scratch the outer surface of the rod body, which may allow the gas sealed inside of the cylinder body to leak out of it.

SUMMARY OF THE INVENTION

The present invention was made in view of the above circumstances and is intended to provide a gas spring that can avoid to the extent possible problems caused by the adhesion of dust of parts of the assembly, which will extend the useful life of the spring and improve its performance.

With this goal in mind, a novel gas spring is provided in which a rod body has a base end side inserted into a cylinder body, with the rod body movable in and out of the cylinder body. The rod body is urged in a direction outwardly of the cylinder body by the pressure of a gas sealed inside the cylinder body. The rod body has a cylindrical cover member at a distal end portion of the rod body that projects from inside the cylinder body. When the rod body is fully extended outside of the cylinder body, the cover member a distal end opening of the cover member is opposed to a head end portion of the cylinder body. When the rod body is contracted inside the cylinder body, the cover member covers a portion of the rod body that projects outside of the head end portion of the cylinder body.

The gas spring described below includes a rod body with a base end side inserted into a cylinder body. The base end side of the rod body is movable in and out of the cylinder body, and is urged in a direction outwardly of the cylinder body by the pressure of a gas sealed inside the cylinder body. The gas spring includes a cylindrical cover body, in which a base end portion of the cover body is connected to a distal end portion of the rod body that projects outside of the cylinder body. A distal end portion of the cover body receives a head end portion of the cylinder body inside the cover body. The cylinder body further includes a cylindrical cover member at an end portion of the cylinder body. When the rod body is extended to its greatest extent from inside the cylinder body, the cover member has a distal end opening that is opposed to the distal end portion of the cover body. When the rod body is contracted back inside the cylinder body, the cover member covers a portion of the rod body that projects from the head end portion of the cylinder body.

The gas spring described below includes a rod body with a base end side inserted into and movable into and out of the cylinder body. The rod end is urged in a direction outwardly of the cylinder body by the pressure of a gas sealed inside the cylinder body. The rod body has a cylindrical cover member at the distal end portion of the rod body that projects from inside the cylinder body. The cover member has the distal end opening that is opposed to the head end portion of the cylinder body when the rod body is projected to its greatest extent from inside the cylinder body. The cover member covers the portion of the rod body that projects from the head end portion of the cylinder body when the rod body is contracted to its greatest extent into the cylinder body. When the rear door of the vehicle is closed, and particularly when the vehicle is being driven and dust is frequently thrown up, the gas spring is in its contracted state. At these times the cover member prevents dust or fine sand from contacting and adhering to the outside of the above-mentioned projecting portion of the rod body. Since dust or fine sand cannot adhere to the above-mentioned projecting portion of the rod body, moreover, the outside of the rod body will not be scratched by foreign matter adhering to the lip portion of the dust seal, and leakage of the gas sealed in side of the cylinder body thus becomes much less likely.

BRIEF DESCRIPTION OF THE DRAWINGS

The present invention will be described below in connection with an embodiment illustrated in the appended drawings, in which:

FIGS. 1(a) and 1(b) side views of a gas spring according to one embodiment;

DETAILED DESCRIPTION OF PREFERRED EMBODIMENTS

Figure 2:
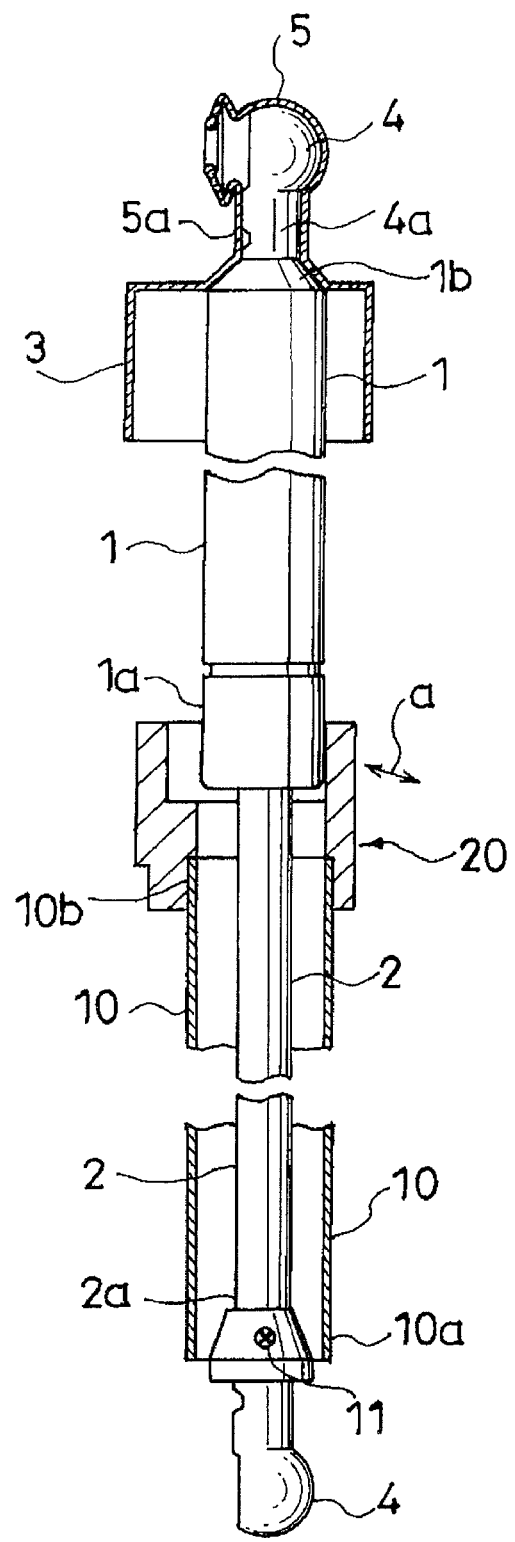
FIG. 2 illustrates another embodiment of the gas spring according to the present invention, as an alternative to that shown in FIG. 1.

A gas spring that embodies the present invention is like other gas springs of this general type in that, as shown in FIG. 1(a), it includes a rod body 2 with a base end side inserted into a cylinder body 1. The rod body 2 is movable into and out of the cylinder body 1. The rod body 2 is urged outwardly of the cylinder body 1 by the pressure of a gas sealed inside the cylinder body 1, i.e., in a direction that tends to expand the gas spring.

This gas spring includes a cylindrical cover member 3 at a distal end portion of the rod body 2 where the end of the rod body 2 projects from inside the cylinder body 1. The cover member 3 covers, as shown in FIG. 1(b), a head end portion 1a of the cylinder body 1 and a distal end portion 2a of the rod body 2 where the rod body 2 projects from the head end portion 1a when the rod body 2 is contracted to its maximum extent into the cylinder body 1.

Thus, in this gas spring, when the rod body 2 is contracted to its greatest possible extent into the cylinder body 1, since the head end portion 1a of the cylinder body 1 and the distal end portion 2a of the rod body 2 that projects from the head end portion 1a are covered by the cover member 3, dust cannot come into contact with and adhere onto those parts.

This makes this gas spring suitable for use in applications in which the gas spring spends most of its time in its contracted configuration, e.g., when the gas spring is contracted when the rear door of a vehicle is closed. Even where dust is thrown up around the gas spring as the vehicle moves, dust cannot land on and adhere to the parts covered by the cover member 3 as described above.

The cover member 3 in the illustration includes a band portion 5a formed integrally with a dust cover 5 that surround a socket 4 of a ball joint adjacent to the distal end portion 2a of the rod body 2. When the dust cover 5 is applied to the socket 4, the cover member 3 is then held in place at the distal end portion 2a of the rod body 2.

In the illustration, the band portion 5a fits over an arm portion 4a to which the socket 4 is joined integrally at the distal end portion 2a of the rod body 2. The band portion 5a is smaller than the socket 4, so that the dust cover will not come off of the socket 4 easily after the dust cover 5 is placed onto the socket 4.

In the illustration a similar socket 4 of the ball joint is also present and formed integrally through an arm portion 4a at the end portion 1b of the cylinder body 1. A corresponding dust cover 5 is attached to and surrounds this socket 4, with the band portion 5a surrounding the arm portion 4a provided integrally with and adjacent to the dust cover 5. The dust cover 5 will thus not come easily off of the socket 4 at the end portion 1b of the cylinder body 1 after it has been installed in place.

As mentioned above, in this gas spring, the chance of dust, fine sand, or the like adhering to the outer surface of the rod body where it moves in and out of the cylinder body, or to a lip portion of the dust seal at the head end portion 1a of the cylinder body 1 is drastically reduced. This accordingly reduces greatly the likelihood that the outer surface of the rod body 2 will be scratched by dust on the lip portion of the dust seal, and as a result, the potential for leakage of the gas sealed inside the cylinder body 1.

The covering effect occurs when the rod body 2 is contracted to the maximum extent inside the cylinder body 1, as shown in FIG. 1B. An alternative configuration can thus be devised in which, instead of having the cover member 3 receive the head end portion 1a of the cylinder body 1 inside of the open end of the cover member, which requires a gap between them, an inner surface of the open end of the cover member 3 may be brought into close contact with the outer surface of the head end portion 1a of the cylinder body 1. As another alternative, the open end of the cover member 3 may be brought to bear against the distal end of the cylinder body 1 where the rod body 2 projects outside of the cylinder body 1.

A basic embodiment of the present invention is described above. Another preferred embodiment is shown in FIG. 2 and described below.

In the gas spring shown in FIG. 2, the rod body 2 has a base end side inserted into the cylinder body 1 and movable into and out of the cylinder body 1. In this embodiment, too, the rod body 2 is urged in a direction outwardly of the cylinder body 1 by the pressure of a gas sealed inside the cylinder body 1.

This gas spring differs, though, in having a lock mechanism. It thus includes a cover body 10 with a cylindrical body and a base end portion 10a of the cover body 10 connected to the distal end portion 2a of the rod body 2 where the rod body 2 projects outside of the cylinder body 1. An end portion 10b of the cover body 10 lies adjacent the head end portion 1a of the cylinder body 1.

As the figure shows, the cover body 10 has its base end portion 10a pivotally attached to the distal end portion 2a of the rod body 2 with a pin 11. The distal end portion 10b is movable in the directions indicated by arrow a in the figure, that is, both forwardly and backwardly at an angle toward and away from the right side of the figure.

A substantially cylindrical stopper member 20 at the distal end portion 10b of the cover body 10 is generally coaxial with the cover body 10, with the head end portion 1a of the cylinder body 1 received inside the stopper member 20.

The stopper member 20 is made of a synthetic resin material to avoid metal-to-metal contact with the cylinder body 1, to reduce the overall weight of the gas spring, and to reduce manufacturing costs for the gas spring.

Since the cover body 10 is movable, the stopper member 20 can thus move perpendicular to the cylinder body 1 when an external force is applied manually to the stopper member.

Figure 3A:
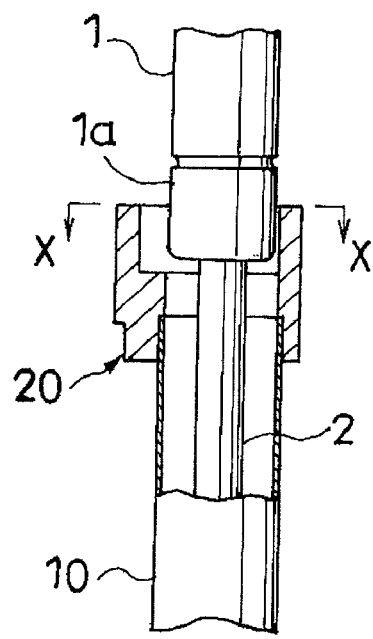
FIGS. 3(a) and 3(b) illustrate the operation of a stopper member.

When no external manual force is applied to the stopper member 20, the axis of the cover body 10 stays aligned with the axis of the rod body 2 as shown in FIG. 2 and FIG. 3(a).

Figure 4A:
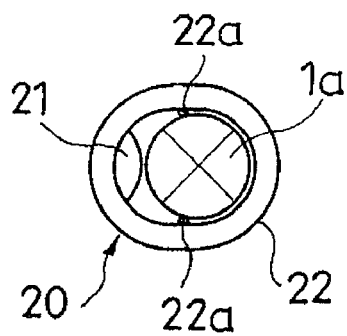
FIGS. 4(a) and 4(b) illustrate the operation of the stopper member, through views taken in section through section lines x-x in FIGS. 3(a) and 3(b)

Therefore, as shown in FIG. 4(a), a lock portion 21 of the stopper member 20 is not opposed to the head end portion 1a of the cylinder body 1, which allows expansion and contraction of the rod body 2 into and out of the cylinder body 1 of the gas spring.

Figure 3B:
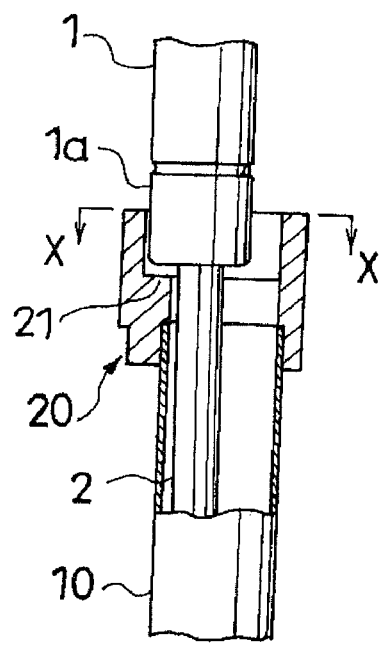

If, though, the stopper member 20 is moved forward perpendicularly to the cylinder body 1 by manual operation, as shown in FIG. 3(b), the axis of the cover body 10 is then inclined with respect to the axis of the rod body 2.

Figure 4B:
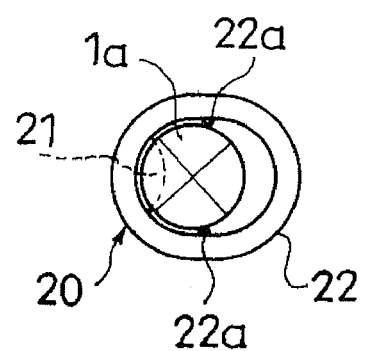

The lock portion 21 of the stopper member 20 then becomes opposed to the head end portion 1a of the cylinder body 1 as shown in FIG. 4(b), which prevents contraction of the gas spring as movement of the rod body 2 into the cylinder body 1 is then blocked.

The stopper member 20 described above is movable back and forth with respect to the cylinder body 1. Means is provided as well for holding the stopper body in position with respect to the cylinder body.

Specifically, as shown in FIGS. 4(a) and 4(b), the stopper member 20 has a projection 22a constituting a detent structure on an inner circumference of a main body portion 22 that receives the head end portion 1a of the cylinder body 1 inside of the main body portion.

The projection 22a is, though this is not shown in detail, in the form of a rib with a length substantially equal to the length of the main body portion 22 in the axial direction. There are a pair of projections 22a, moreover, with the cylinder body 1 sandwiched from either side between the projections 22a.

The projections 22a are made as ribs for durability and abrasion resistance as compared with a case where the projections 22a are formed at a point. Therefore, as long as the abrasion resistance is sufficient, the projections may be made not as ribs but as pins or points.

The distance between the pair of projections 22a is slightly less than the diameter of the head end portion 1a of the cylinder body 1. A relatively large external force is thus required to pass the head end portion 1a of the cylinder body 1 between the projections 22a, and the head end portion 1a of the cylinder body 1 cannot move inside the main body portion 22 of the stopper member 20 without a large external force being applied to it.

As a result, a manually applied external force is required to move the stopper member 20 with respect to the cylinder body 1, and so the stopper member 20 can be held in place at a desired position.

The gas spring shown in FIG. 2 includes a cover member 3 that is generally similar to that of the gas spring in FIG. 1 in that the cover member 3 covers some portions of the spring that would otherwise be exposed to the air while the spring is in its contracted state.

That is, in the gas spring shown in FIG. 2, the cylindrical cover member 3 is provided at the end portion 1b of the cylinder body 1, with the cover member 3 covering a part of the end portion 1b that would otherwise remain exposed to the air when the gas spring is in its fully contracted position.

Figure 5:
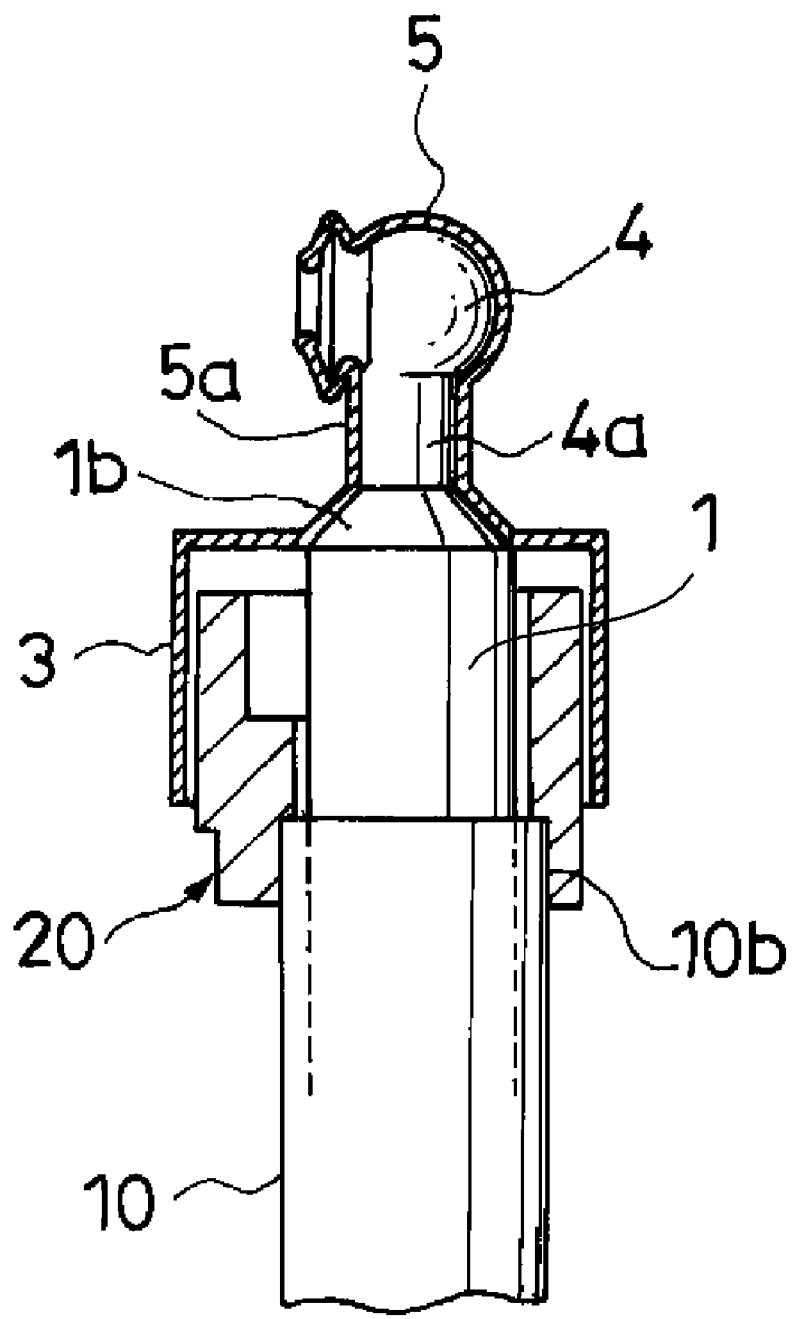
FIG. 5 illustrates the operation of the cover member in covering an exposed portion of the gas spring.

Specifically, when the gas spring is fully contracted as shown in FIG. 5, the cylinder body 1 is received inside the stopper member 20 of the cover body 10.

If the cover member 3, which will be described below, were not provided, when the gas spring is in its maximum contracted state, the distal end portion 10b of the cover body 10 would still leave a part of the end portion 1b of the cylinder body 1 portion exposed to the air between the stopper member 20 and the cylinder body 1, and at the end portion 1b of the cylinder body 1, as the figure indicates.

Since the gas spring in this embodiment includes the cover member 3, however, when the gas spring is contracted to its maximum extent the cover member 3 covers the portion that would otherwise be exposed to the air between the stopper member 20 and the bottom end portion 1b of the cylinder body 1.

Therefore, if the gas spring shown in FIG. 2 is used at the rear door of a vehicle, for example, when the rear door is closed and the running vehicle throws up dust, the dust, fine sand, and the like, cannot adhere to the portions of the gas spring that would be left exposed if the cover member 3 were not provided.

In the gas spring shown in FIG. 2 the dust or fine sand is prevented from acting as polishing material that might otherwise adversely affect the stopper member 20.

That is, as mentioned above, the gas spring shown in FIG. 2 includes a synthetic resin material stopper member 20. The detent structure on the stopper member 20 can hold the stopper member 20 in position or allow it to be moved with respect to the cylinder body 1 by an external force applied as a manual operation.

The structure described above helps to prevent malfunctioning of the detent structure, that might otherwise occur due to diminishment of the projections 22a that form the detent structure through polishing by dust or fine sand.

This helps to prevent deterioration of the lock function in the gas spring that includes a lock mechanism, which might otherwise be caused by adhesion of dust, thereby extending the useful life of the gas spring.

The cover member 3 shown in FIG. 2 is formed integrally with the dust cover 5 similarly to the cover member 3 shown in FIG. 1. The dust cover 5 surrounds the socket 4 that forms a part of the ball Joint that lies adjacent the bottom end portion 1b of the cylinder body 1.

And as is shown in the figure, the band portion 5a that surrounds the arm portion 4a is provided integrally adjacent to the dust cover 5 that surrounds the socket 4, with the cover member 3 is provided integrally adjacent to the band portion 5a.

Since the band portion 5a surrounds the arm portion 4a, which is smaller than the socket 4, after the dust cover 5 is installed over the socket 4, the dust cover 5 will not slip easily off of the socket 4.

Also, as is shown in the figure, the socket 4 of the ball joint is provided integrally adjacent to the distal end portion 2a of the rod body 2. There is, though, no direct attachment of a dust cover 5 to the socket 4 on the rod body 2.

In the embodiment of FIG. 2, the cover body 10 has its base end portion 10a pivotally attached to the distal end portion 2a of the rod body 2, and capable of inclination with respect to the rod body 2. An alternative embodiment of the invention, though such is not shown in the figures, may be one in which the cover body 10 is fixed and not movable to incline with respect to the rod body 2.

Even if the cover body 10 is of such a fixed type, though this is also not shown in the figures, when the rod body 2 is contracted to its maximum extent into the cylinder body 1, the cover member 3 may receive the head end portion 1a of the cylinder body 1 inside it with a gap between the opening of the cover member and the outside of the end portion 1a of the cylinder body. The inner circumference of the distal end opening of the cover member 3 may in the alternative be brought into close contact with the outer circumference of the head end portion 1a of the cylinder body 1, or as a further alternative, the distal end opening of the cover member 3 may be brought to abut the distal end of the cylinder body 1 from which the rod body 2 is projected.

What is claimed is:

1. A gas spring in which a rod body having a base end side inserted into a cylinder body and capable of movement into and out of the cylinder body is urged in a direction outwardly of the cylinder body by the pressure of a gas sealed inside the cylinder body, wherein the gas spring includes a cover body having a substantially cylindrical shape, and wherein a base end portion of the cover body is connected to a distal end portion of the rod body that projects outside of the cylinder body, and wherein a distal end portion of the cover body has a head end portion of the cylinder body received inside the cover body, and wherein the cylinder body has a cover member, having a substantially cylindrical shape and formed at a bottom end portion, and wherein the gas spring further comprises a stopper member attached to the distal end of the cover body, the stopper member being substantially cylindrical in shape and having an opening at an end thereof, wherein when the rod body is projected to a maximum extent from inside the cylinder body, the cover member has an end opening opposed to the distal end portion of the cover body, and wherein the end opening has an inside diameter larger than an outside diameter of the cylinder body, and wherein when the rod body is contracted to a maximum extent into the cylinder body, the cover member blocks the end opening of the stopper member.

2. The gas spring according to claim 1, wherein the base end portion of the cover body is pivotally attached to the distal end portion of the rod body, wherein the stopper member has a substantially cylindrical distal end portion that is substantially coaxial with the cover body with the head end portion of the cylinder body receivable inside of the stopper member, wherein the stopper member is movable generally perpendicular to the cylinder body in response to an external force applied manually to the stopper member, wherein when an axis of the cover body is aligned with an axis of the rod body, movement of the rod body into and out of the cylinder body is enabled, and wherein when the axis of the cover body is inclined with respect to the axis of the rod body, movement of the rod body into the cylinder body is prevented by the stopper member.

3. The gas spring according to claim 1, wherein a socket that forms a part of a ball joint is provided adjacent the bottom end portion of the cylinder body and wherein the cover member further comprises a single piece construction and an integral dust cover and encloses said socket and is held at the bottom end portion of the cylinder body.

* * * * *